United States Patent Office 3,336,809
Patented Aug. 22, 1967

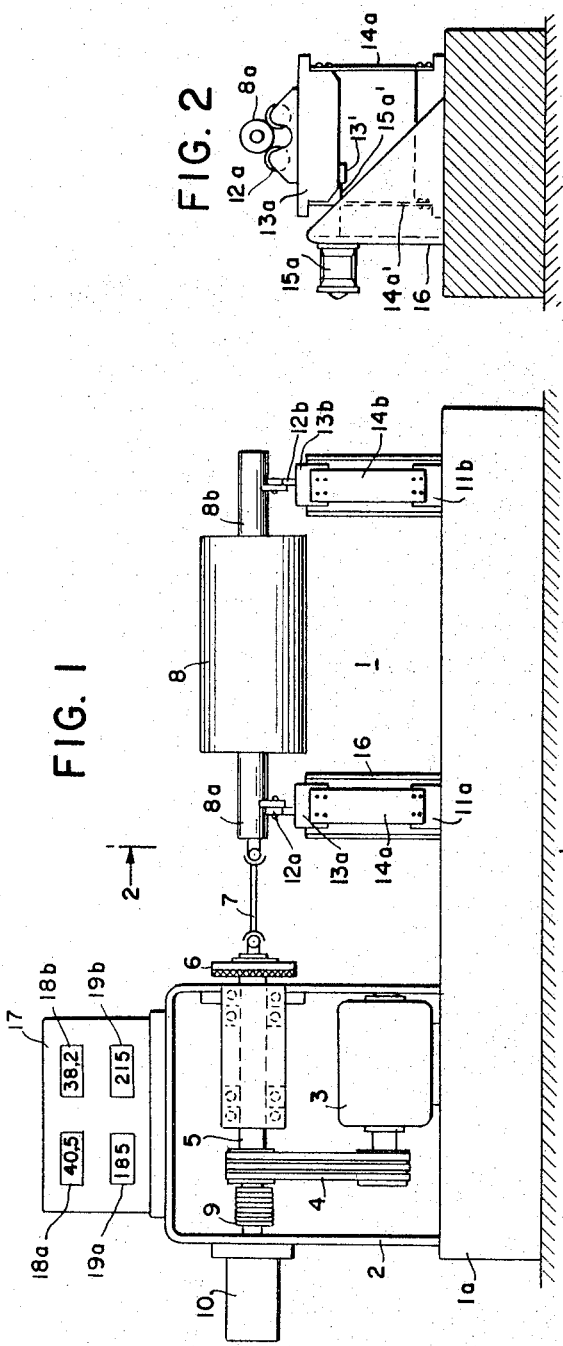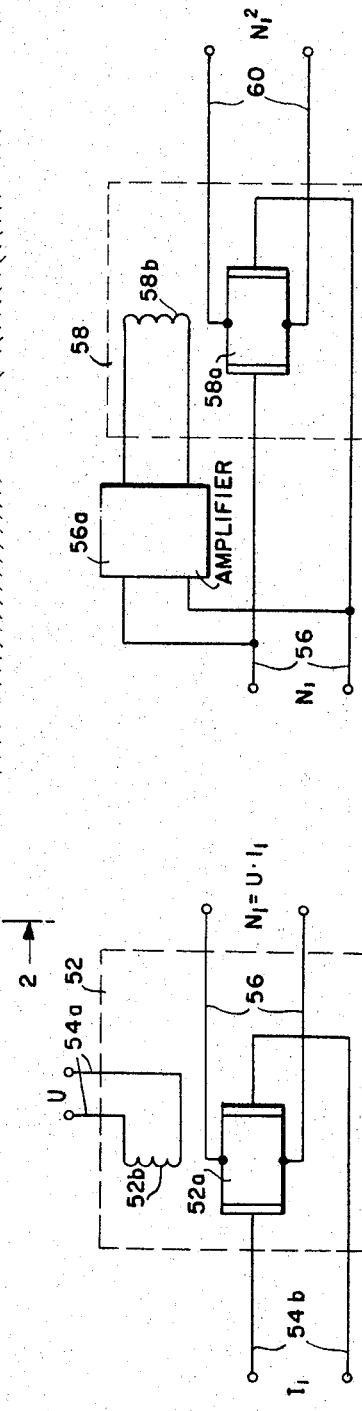

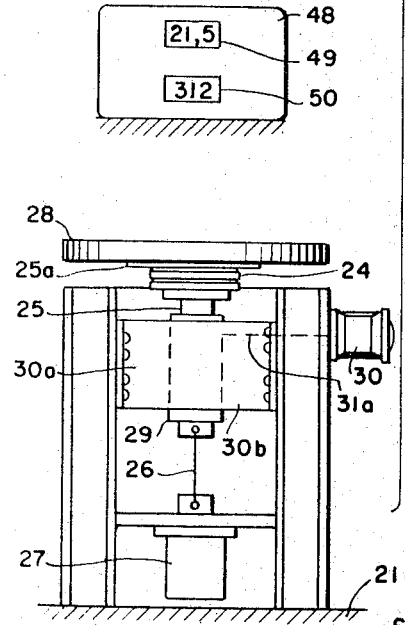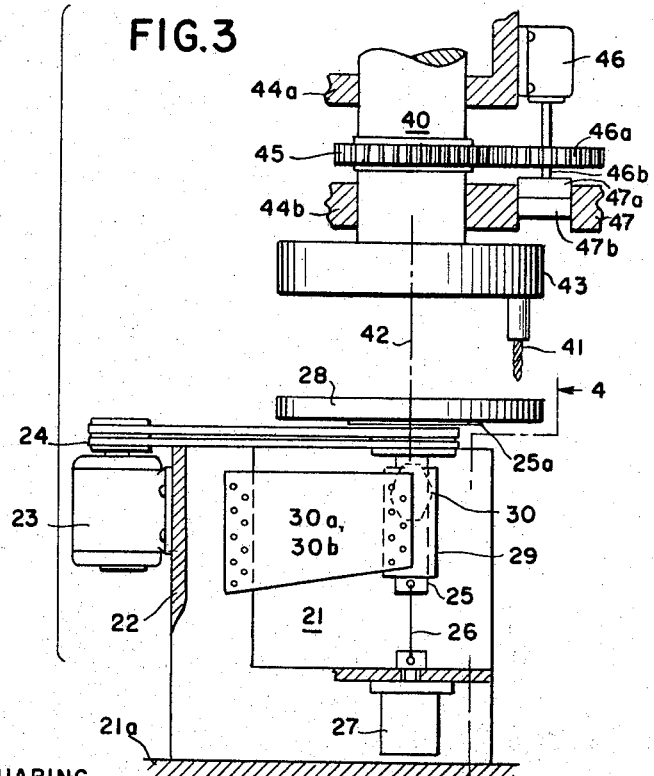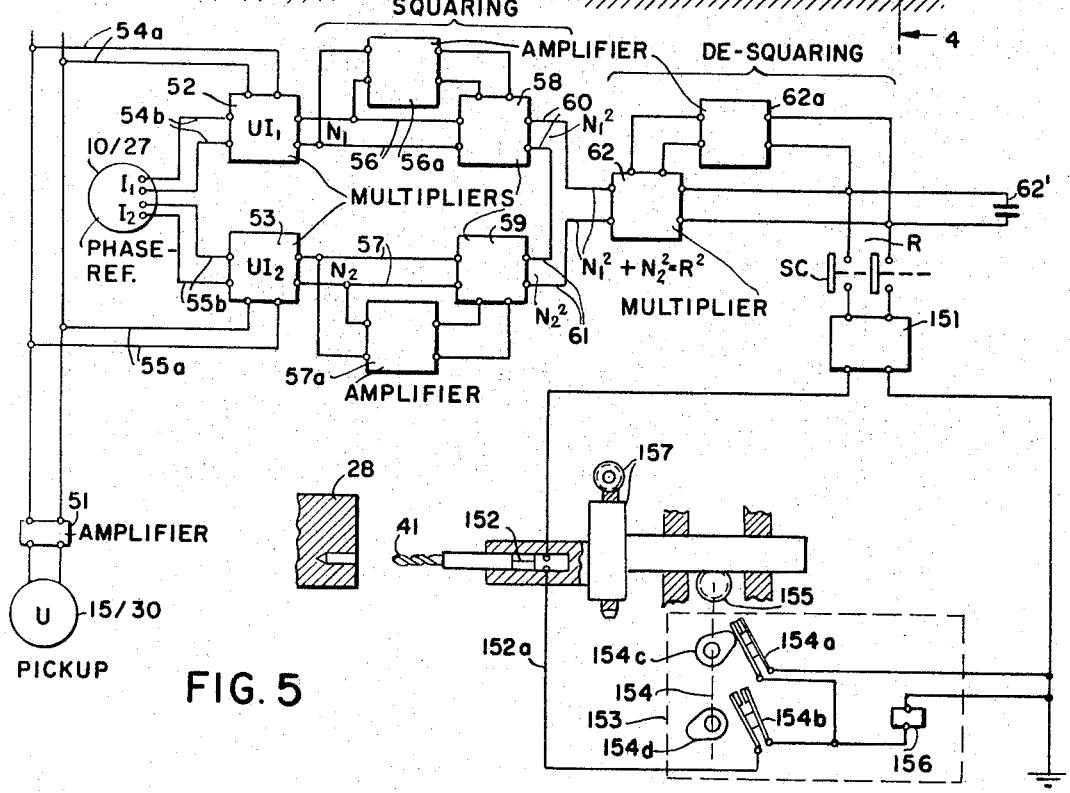

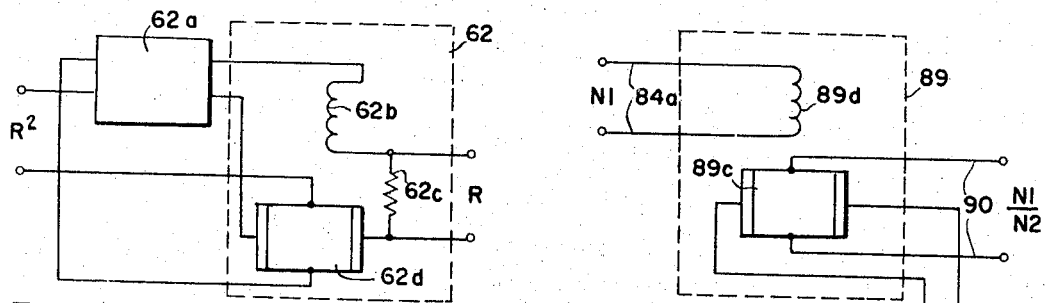
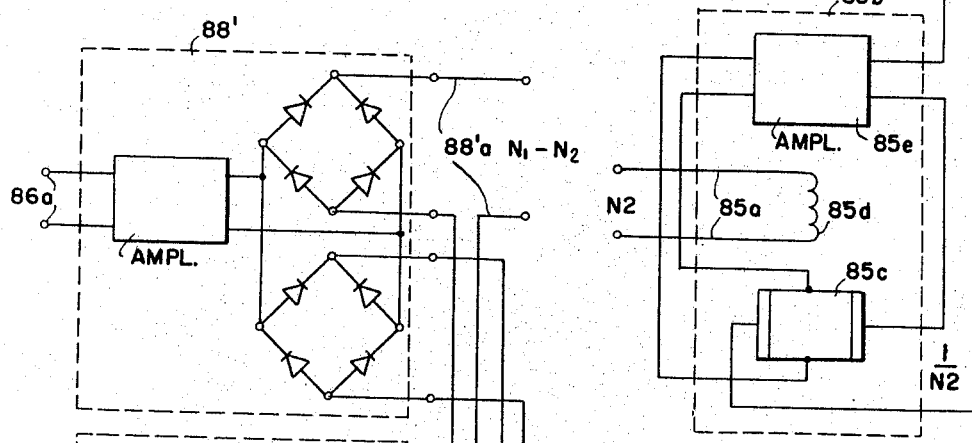
FIG. 12
FIG. 14
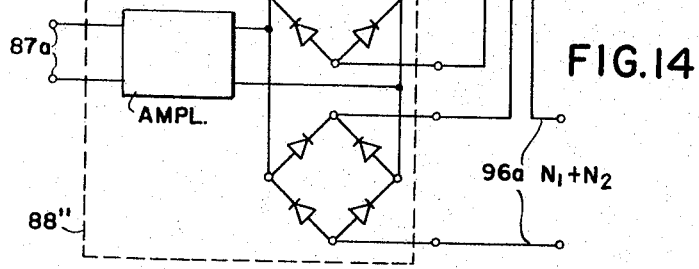
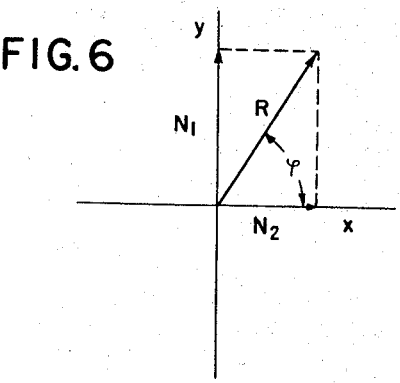
FIG. 6
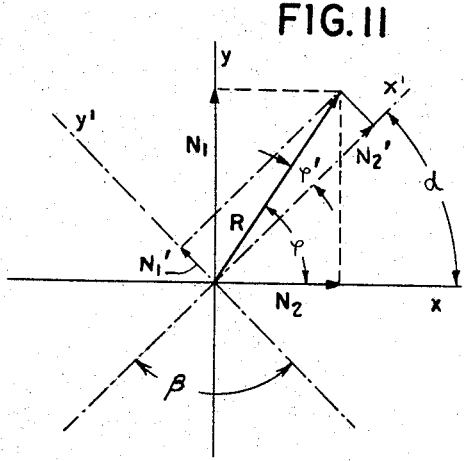
FIG. 11

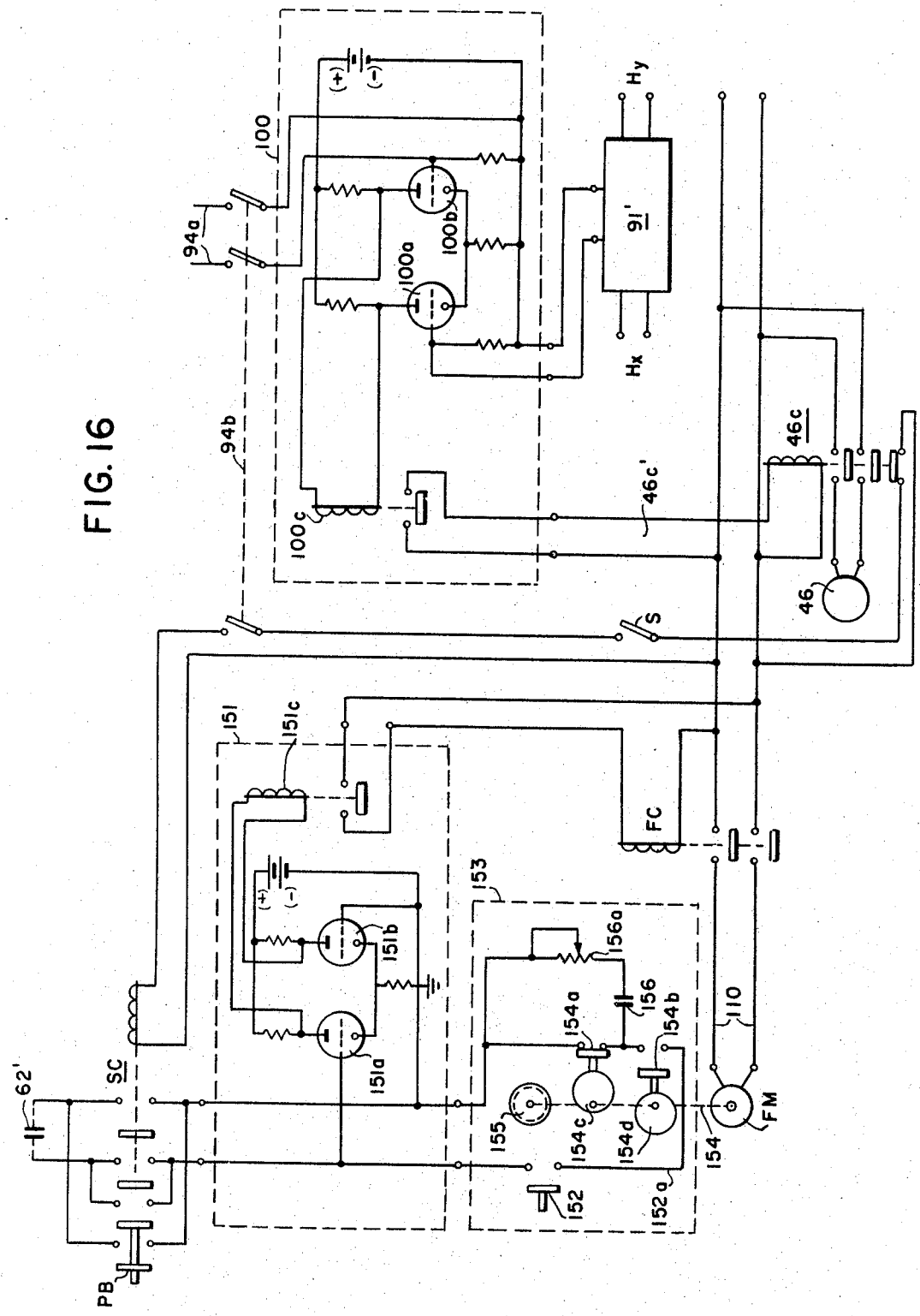

3,336,809
METHOD AND APPARATUS FOR BALANCING ROTATING BODIES
Heinrich Hack, Darmstadt, Germany, assignor to Carl Schenck Maschinenfabrik G.m.b.H., Darmstadt, Germany, a corporation of Germany
Filed June 4, 1964, Ser. No. 372,657
Claims priority, application Germany, May 14, 1959, Sch 26,060
15 Claims. (Cl. 73—462)

The present application is a continuation-in-part application of pending application Ser. No. 29,008, filed May 13, 1960, and entitled, "Method and Apparatus for Balancing Rotating Bodies," and now abandoned.

My invention relates to methods and apparatus for measuring and correcting unbalance of a rotating body.

Known machines for such purposes possess measuring devices which determine the magnitude and angular position of unbalance within one or more predetermined correction planes crossing the rotating body and extending transverse to its axis of rotation. Such balancing machines may also have control devices for automatically correcting any measured unbalance by eliminating or adding material in accordance with the previously measured data. As a rule, the unbalance measuring operation is accomplished by an electrical system. If this system is of the current or voltage-responsive type, it must have resonant filter circuits so that the measured results are due only to the effects of the unbalance to be measured and are not falsified by spurious voltages also occurring during the measuring run of the workpiece. For that reason, it is generally preferable to use a measuring system of the wattmetric type because it is not affected by other than the genuine unbalance oscillations of the workpiece so that no additional filter devices are required.

In conventional wattmetric balancing systems, a wattmetric moving-coil instrument is supplied with two electric magnitudes. One of these is a voltage or current supplied from a transducer, such as an electrodynamic vibration pickup, that responds to oscillatory forces or oscillatory deflections of the workpiece occurring periodically at the frequency of workpiece rotation as a result of any unbalance inherent in the workpiece. The other electric magnitude supplied to the wattmetric instrument is an auxiliary phase-reference current or voltage produced by an auxiliary generator (phase transmitter) which is driven together with the workpiece so as to furnish a voltage or current synchronous with the workpiece rotation. The wattmetric instrument then acts to multiply the two input voltages or currents and indicates the magnitude of the unbalance by the resulting deflection of the moving coil. By shifting the phase of the auxiliary reference voltage, such as by changing the angular position of the stator in the auxiliary generator, the wattmetric deflection can be set to zero, in which case the amount of the required phase shift is indicative of the angular position of the unbalance. If the so-called "polar measuring method" just mentioned, often used in practice, is to be employed for automatically controlling the necessary unbalance-correction work, it is necessary to translate the measured values into suitable control signals. This may be done with the aid of photoelectric or contact-electric components, as known, for example, from British Patent 789,376. However, a considerable amount of accessory equipment is needed for such purposes and an appreciable loss of time, required for the displacement of the mechanical control members in the data-translating equipment, is involved.

More suitable for automatic control of unbalance-correction work, in the present state of the art, are balancing machines operating on the principle of the Cartesian-coordinate method. This method requires using an auxiliary phase-reference generator which furnishes two alternating currents mutually phase displaced a fixed angle, usually 90°, corresponding to the angle between the two coordinates of the Cartesian reference system. The two alternating reference currents are supplied to respective wattmeters which are both simultaneously energized by oscillation-responsive transducer voltage as used in the above-mentioned polar method. Furthermore, if the workpiece is prepared for the so-called prelocated unbalance correction, as known from the article by Oschatz on prelocated unbalance correction, published in ZDI-Zeitschrift vol. 88, July 8, 1944, page 357 and following, each measuring result can be referred to these predetermined locations of the workpiece, and the balance correction can then be automatically effected at these locations, as is known, for example, from U.S. Patent 2,810,307.

However, for certain applications, the Cartesian-coordinate method of balancing is less desirable than the polar method, for example when it is preferable to correct unbalance at only one location in each correction plane, and where the polar method is needed for determining the amount of unbalance correction as well as the angular location of the unbalance center.

It is therefore an object of my invention to improve balancing and balance-correcting machines on the polar-coordinate principle so as to directly furnish electric voltages or currents that are indicative of the amount and angular position of unbalance to be corrected, thus facilitating and improving an automatic correction of unbalance on the polar principle.

It is another, subsidiary object of my invention to devise an unbalance measuring and/or unbalance-correcting apparatus using the polar principle, in which the wattmetric measuring components are constituted by solid-state devices and hence do not require moving coils that are more susceptible to breakdown and require an appreciable amount of time for proper operation. More particularly, the invention aims at permitting the use of semiconductor units, such as Hall-voltage generators, as wattmetric components, such devices comprising a semiconductor body traversed by electric current and subjected to a magnetic field in order to produce between two probe electrodes a voltage proportional to the product of the energizing current times the current used for producing the magnetic field.

To achieve these objects, and in accordance with my invention, I first determine the product of the unbalance magnitude of two voltages of which one is supplied from an oscillation-responsive transducer and the other from a phase-reference generator. I then provide an electric voltage equal to the square of the product, and I determine the angular position of the unbalance by forming the quotient of the same two voltages. This results in electric output magnitudes applicable for the automatic control of correction work as needed for eliminating an unbalance measured in accordance with the polar measuring principle. As will be more fully set forth hereinafter, the above-mentioned computing steps are performed simultaneously by electric computing devices, preferably of the solid-state type.

In order that the present invention may be readily carried into effect, it will now be described with reference to the accompanying drawings, wherein:

FIG. 1 is a front view, seen from the attendant's place, of an embodiment of a dynamic balancing machine suitable for the purposes of the present invention;

FIG. 2 is a side view, partly in section, of the embodiment of FIG. 1, taken along the lines 2—2;

FIG. 3 is a front view, partly in section, of another embodiment of a dynamic balancing machine of the present invention;

FIG. 4 is a side view of the embodiment of FIG. 3, taken along the lines 4—4;

FIG. 5 is a schematic circuit diagram of an embodiment of an unbalance-amount responsive measuring portion of a correction-control system according to the present invention, applicable to machines exemplified by FIGS. 1 and 2 and FIGS. 3 and 4;

FIG. 6 is an explanatory vector diagram;

FIGS. 7, 8 and 9 are circuit diagrams of embodiments of computing components which may be utilized in the circuit arrangement of FIG. 5;

FIG. 11 is an explanatory vector diagram;

FIGS. 12, 13 and 14 are circuit diagrams of embodiments of components which may be utilized in the circuit arrangements of FIGS. 10a, 10b;

FIG. 16 is a schematic circuit diagram of details of the arrangements of FIGS. 5 and 6 and illustrates the interconnections of the two component systems of FIGS. 5 and 10a, 10b.

Figure 10A:
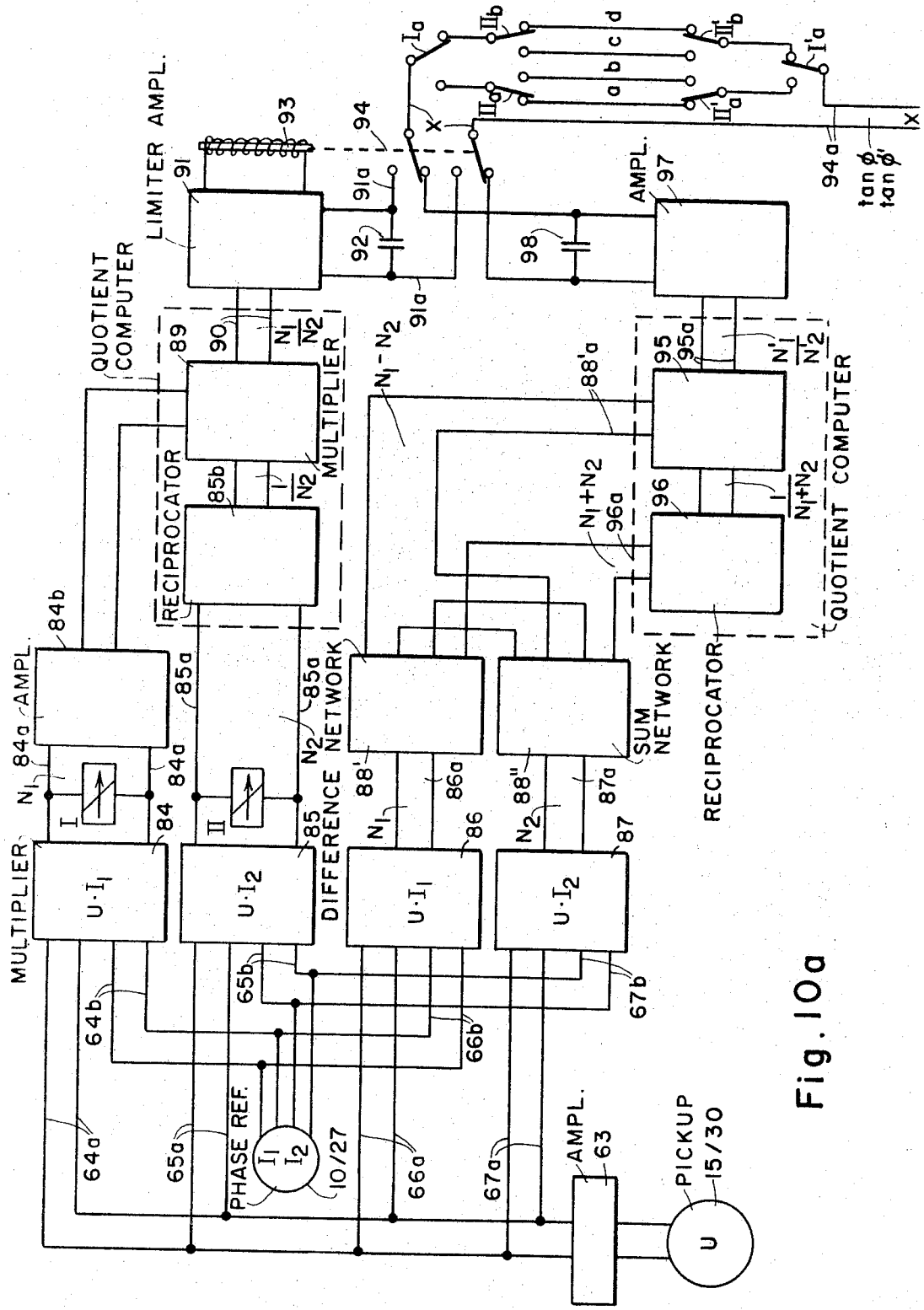
FIGS. 10a and 10b are a schematic circuit diagram of an embodiment of an unbalance-angle responsive portion of a correction-control system according to the present invention applicable conjointly with the system portion of FIG. 5 to machines exemplified by FIGS. 1, 2, 3 and 4.

In the machines illustrated in FIGS. 1, 2, 3 and 4, the workpiece is journalled on bearings which are supported on a structure resilient in a given direction so as to perform oscillations if the rotating workpiece is unbalanced. These oscillations are sensed by transducers, such as electrodynamic vibration pickups, which translate the oscillations into alternating electric voltages. However, the particular type of unbalance-responsive transducer is not essential to the invention. Applicable are also transducers that do not respond to oscillatory motion but to oscillatory forces. Hence, pressure-responsive transducers may be used in conjunction with a rigid support of the rotor journals in order to provide an output voltage or current proportional to the periodic forces imposed upon the supporting structure if the rotating workpiece is unbalanced. Relating, for convenience, to the use of unbalance-responsive transducers of the motion-responsive type, the analytical concepts involved in the present invention can be stated as follows:

In a balancing machine and associated electric circuits of the type here of interest and more fully described below, the following magnitudes are available.

(a) The magnitude of a voltage U supplied from the transducer in response to unbalance of the workpiece when rotating in the balancing machine, and (b) the magnitude of two currents $I_1$ and $I_2$ which are supplied from an auxiliary generator rotating in synchronism with the workpiece. These two currents are phase displaced from each other by a given angle, preferably 90°, in accordance with the angle between two coordinate reference axes which, for convenience, are hereinafter called "vertical" and "horizontal" axes and which, if desired, may indeed have vertical and horizontal directions respectively as viewed by the attendant.

With a phase angle of $\beta=90°$ between the two phase-reference currents, the vertical unbalance component $N_1$ has the value (1) $$N_1 = U \cdot I_1 \cdot \sin \varphi$$

and the horizontal unbalance component $N_2$ has the value (2) $$N_2 = U \cdot I_2 \cdot \cos \varphi$$

(see FIG. 6 of the drawing). By squaring each of these two values and then adding the two squared amounts, the resultant unbalance magnitude R corresponds to the equation:

(3) $$R^2 = N_1^2 + N_2^2$$

If in Equation 3 the values from Equations 1 and 2 are substituted for $N_1$ and $N_2$, and if $I_1$ and $I_2 = I$, then:

(4) $$R^2 = U^2 \cdot I^2 (\sin^2 \varphi + \cos^2 \varphi) = U^2 \cdot I^2$$

The direction or angular position of the unbalance has no influence upon the determination of these magnitudes.

The unbalance direction results as the angle $\varphi$ from the quotient of the measuring values $N_1$ and $N_2$ as follows:

(5) $$\frac{N_1}{N_2} = \frac{U \cdot I_1 \cdot \sin \varphi}{U \cdot I_2 \cdot \cos \varphi} = \frac{I_1}{I_2} \cdot \tan \varphi$$

for $I_1 = I_2 = I$, it follows that (6) $$\frac{N_1}{N_2} = \tan \varphi$$

(see FIG. 6) of the drawing).

However, the values of tangent functions vary between zero and infinity. To obtain only finite values, the measurements are limited to an angular range of 45°, and the ratio $N_1:N_2$ may then be referred to two coordinate systems $x$–$y$ and $x'$–$y'$ displaced 45° from each other about the same point of origin (FIG. 11 of the drawing).

When rotating a coordinate system through an angle $\alpha = 45°$, the coordinates of any point, designated by $x$ and $y$ in the original system of coordinates, become transformed to:

(7) $$x = x' \cos 45° - y' \sin 45°$$

(8) $$y = x' \sin 45° + y' \cos 45°$$

wherein $x$, $y$ and $x'$, $y'$ correspond to the measuring values $N_2$, $N_1$ and $N_2'$, $N_1'$ respectively. Hence, now:

(9) $$N_1 = N_2' \sin 45° + N_1' \cos 45°$$

(10) $$N_2 = N_2' \cos 45° - N_1' \sin 45°$$

Since $\sin 45° = \cos 45°$, the equations become simplified to:

(11) $$N_1 = (N_2' + N_1') \cdot 0.707$$

(12) $$N_2 = (N_2' - N_1') \cdot 0.707$$

The direction of the unbalance in the new system of coordinates, turned 45° from the original system, is determined as the angle $\varphi'$ from the quotient of the measuring values $N_1'$ and $N_2'$, after transforming the Equations 11 and 12 to the following form:

(13) $$N_1' = \frac{N_1}{0.707} - N_2'$$

(14) $$N_2' = \frac{N_2}{0.707} + N_1'$$

It follows that:

(15) $$N_1' = \frac{N_1}{0.707} - \frac{N_2}{0.707} - N_1'$$

(16) $$2N_1' = \frac{N_1}{0.707} - \frac{N_2}{0.707}$$

(17) $$N_2' = \frac{N_2}{0.707} + \frac{N_1}{0.707} - N_2'$$

(18) $$2N_2' = \frac{N_2}{0.707} + \frac{N_1}{0.707}$$

(19) $$\tan \varphi' \frac{N_1'}{N_2'} = \frac{2N_1'}{2N_2'} = \frac{\frac{N_1}{0.707} - \frac{N_2}{0.707}}{\frac{N_2}{0.707} + \frac{N_1}{0.707}} = \frac{\frac{N_1 - N_2}{0.707}}{\frac{N_2 + N_1}{0.707}}$$

When incorporating the aforedescribed mathematical operations in a balance measuring apparatus, it is preferable to use for the normal $x$–$y$ system of coordinates the sectors that correspond to the angular values $\varphi$ from 22.5° to 67.5° (Equation 6) and to provide the equipment with a limiting device which switches the system to the second system of $x'$–$y'$ coordinates according to Equation 15 when the angular position of the unbalance responded to is outside of the range from 22.5 to 67.5°.

Before describing the measuring and control systems according to the invention for realizing in practice the operations explained above, a description will first be given of machines suitable for use with the invention as illustrated in FIGS. 1, 2, 3 and 4.

The balancing machine 1 of FIGS. 1 and 2 comprises a housing 2 which is mounted on a foundation 1a and accommodates an electric drive motor 3 with transmission belts 4 for driving a shaft 5 which carries an angle-indicating disc 6 and is coupled by a Cardanic link 7 with the shaft portion 8a of a work piece or rotor 8 to be tested and corrected for balance. A flexible clutch member 9 connects the shaft 5 with an auxiliary generator 10 mounted on housing 2 to serve as a phase or angle reference transmitter. The clutch 9 is such as to drive the rotor of generator 10 at the speed of workpiece rotation and in a fixed angular position relative thereto.

The shaft portions 8a and 8b of the workpiece 8 are journalled in respective roller bearings 12a and 12b. The roller bearings are mounted on bridges 13a and 13b which are supported on the foundation 1a by a system of leaf springs 14a, 14a', 14b which permit the bearing bridges to perform oscillations in a horizontal plane due to unbalance of the rotating workpiece. A transducer 15a, such as an electrodynamic vibration pickup, is mounted on a rigid housing structure 16 which protects the vibratory supporting assembly. The pickup 15a is connected by a link 15a' with a connecting member 13' of the bearing bridge 13a. Consequently when the workpiece is kept in rotation at the proper speed, any oscillations of the bearing bridge 13a in the horizontal plane are transmitted to the pickup 15a which translates the vibrations into a corresponding alternating voltage. The other supporting structure with bearing bridge 13b is provided with a corresponding pickup (not illustrated).

Mounted on the machine housing 2 is an electric measuring assembly 17 with instruments 18a, 18b for indicating the magnitude of unbalance in the respective two correction planes of the workpiece. The measuring assembly 17 is further provided with instruments 19a and 19b for indicating the angular position of the gravity center of unbalance in the respective two correction planes.

After the workpiece is inserted into the machine the motor 3 is energized to rotate the workpiece at the desired constant speed. During the measuring run and in the event the workpiece is unbalanced, the pickups provide respective alternating voltages synchronous with the workpiece rotation; and the phase generator 10 then furnishes two alternating currents, preferably of sinusoidal wave shape, 90° displaced from each other. The pickup voltages and the phase reference currents are then used for determining the magnitude and angular position of unbalance with respect to the two corrections planes and, as the case may be, for controlling a machine tool or other device for correction of the unbalance. This will be more fully explained hereinafter with reference to FIGS. 5, 10a, 10b, 15 and 16.

The balancing machine shown in FIGS. 3 and 4 is of the upright type and serve for unbalance correction in a single correction plane. The machine 21 comprises a housing 22 firmly mounted on a foundation 21a. Mounted on the housing 22 is a drive motor 23 which rotates a vertical shaft 25 through a belt transmission 24. The shaft 25 carries a circular chuck 25a for attaching a disc-shaped workpiece 28 in coaxial relation to the shaft 25. The shaft 25 is coupled by a universal link 26 with an auxiliary generator 27 serving as a phase reference transmitter. The shaft 25 is journalled in a bearing structure 29 supported by leaf springs 30a, 30b which, during rotation of the workpiece, permit the bearing structure 29 and hence the shafts 25 with the workpiece 28 to oscillate in the horizontal plane due to the effect of any workpiece unbalance.

Mounted on the housing structure 22 is a transducer, for example an electrodynamic vibration pickup 30, which is coupled with the bearing structure 29 by a connecting link 31a. The machine is further provided with a machine tool assembly 40 for correction of workpiece unbalance. In the illustrated embodiment, the machine tool assembly is a drill press which has a drill 41 mounted in eccentric relation to the center axis 42 common to the balancing-machine shaft 25 and the pivot structure about which the tool holder 43 can be turned. The drill 41 is spaced from the common machine axis 42 a fixed radial distance and can be adjusted to any angular position of workpiece unbalance by rotating the holder 43 about the machine axis 42. The support of the tool holder 43 comprises stationarily mounted bearing structures 44a, 44b. The angular displacement of the tool about the axis 42 is effected by means of a spur gear 45 firmly joined with the tool holder 43 and meshing with a spur gear 46a driven from a control motor 46 (FIGS. 3, 10a, 10b, 15, 16). The shaft 46b of control motor 46 also drives the two displaceable tap contacts or sliders of a twin potentiometric device 47 (FIG. 3, denoted by 47a and 47b in FIGS. 10a, 10b and 16) whose purpose and operation will be described in a later place.

The machine is equipped with a measuring assembly 48 which may be mounted on the machine housing or separate therefrom. The assembly 48 comprises an instrument 49 for indicating the unbalance magnitude and an instrument 50 for indicating the direction or angular position of the unbalance.

When the workpiece 28 is properly attached to the shaft 25 and placed in rotation at the desired constant speed, any unbalance of the workpiece manifests itself by the occurrence of an alternating pickup voltage which is compared with the phase-reference current or voltage in order to obtain an indication of the unbalance magnitude and its angular position. This will be more fully described in the following.

Before dealing with the measuring and control systems according to the invention, it may be mentioned that the symbols for the various measuring magnitudes used in the following are identical with those apparent from the above-presented equations. For convenience, however, the symbols are briefly restated as follows:

$I_1$—phase reference current of 0° phase position (sine current)
$I_2$—phase reference current of 90° phase position (cosine current)
$N_1$, $N_1'$—vertical unbalance components
$N_2$, $N_2'$—horizontal unbalance components
$R$, $R'$—resultant unbalance vector
$U$—pickup voltage
$\varphi$—angle between $N_2$ and $R$
$\varphi'$—angle between $N_2'$ and $R$

*Measurement of unbalance magnitude*

The circuit diagram shown in FIG. 5 is applicable for measuring the magnitude of unbalance in machines of the type described above with reference to FIGS. 1, 2, 3 and 4. As in FIGS. 1, 2, 3 and 4, an electrodynamic or other transducer is denoted in FIG. 5 by 15 (30), and a phase reference generator is denoted by 10 (27).

The pickup voltage $U$ is applied, if desired through an amplifier 51, to the respective input circuits 54a and 55a of two multiplying computer units 52 and 53. The phase reference generator 10 (27) furnishes two currents $I_1$ and $I_2$ which are 90° phase displaced from each other and are representative of the vertical and horizontal unbalance components respectively. The two phase reference currents are supplied, if necessary upon amplification, to the respective two other input circuits 54b, 55b of the same two multipliers 52 and 53. Each of the multipliers 52 and 53 furnishes in its output circuit 56 or 57 a voltage corresponding to the product of the two input magnitudes. Consequently, the voltage in output circuit 56 is proportional or equal to $U \cdot I_1 \sin \varphi = N_1$, and the output voltage in circuit 57 is proportional or equal to $U \cdot I_2 \cos \varphi = N_2$. The voltages $N_1$ and $N_2$ are thus in accordance with the unbalance magnitudes obtaining in the workpiece 8 (or 28) relative to the two coordinate directions $(x, y)$ of the correction plane.

The multiplying computers 52 and 53, as well as those described hereinafter, may be of any suitable electric type. That is, these computer units are called upon to respond to two electric input magnitudes by forming an output voltage or current which is proportional to the geometric (wattmetric) product of the two input magnitudes. Preferably used for the purpose of the invention, however, are electric computer units of the static type such as known, for example from U.S. Patent 2,808,988. Another computer, involving the Hall-voltage principle and suitable for use as multiplier 52 or 53, is separately illustrated in FIG. 7. This device comprises a semiconductor wafer 52a of indium arsenide or indium antimonide which has two current supply terminals by means of which the phase reference current $I_1$ is passed longitudinally through the wafer. The wafer 52a is further provided with two probe electrodes located on opposite edges halfway between the current supply terminals. These electrodes are connected with the output circuit 56 to furnish the product voltage $N_1 = U \cdot I_1 \sin \varphi$. The pickup voltage U is impressed upon a magnetic field winding 52b in whose field the wafer 52a is located so that the direction of the magnetic field is perpendicular to the plane of the wafer.

Reverting to FIG. 5, each of the two product voltages $N_1$ and $N_2$ is supplied to another electric computer unit operating as a squaring device. Each squaring device comprises a multiplier unit 58 or 59. One input circuit of this unit is impressed by the voltage $N_1$ or $N_2$. A second input voltage impressed upon the multiplier unit is proportional to $N_1$ or $N_2$ and is supplied through an amplifier 56a or 57a to permit adjusting the second input voltage so that the output voltage of the multiplier unit 58 or 59 is proportional to the square of the voltage $N_1$ or $N_2$.

Suitable for use as such a squaring device is a Hall-voltage generator similar to the one described above with reference to FIG. 7 and separately shown in FIG. 8. The voltage $N_1$ is impressed upon the current supply terminals of the semiconductor wafer 58a, and the magnetic field winding 58b is connected through the amplifier 56a to the same voltage $N_1$. As a result, the device multiplies the voltage $N_1$ by itself and thus furnishes in the output circuit 60 a voltage corresponding to the value $N_1^2$.

The two output circuits 60 and 61 of the respective multipliers 58 and 59 (FIG. 5) are connected in series with each other in voltage-cumulative relation. Thus, the two voltages $N_1^2$, $N_2^2$ are added to provide a resulting voltage $R^2 = N_1^2 + N_2^2$. This result of the addition is the square value of a voltage vector R (FIG. 6) indicative of the measured unbalance magnitude. Consequently, the system components described in the foregoing fully solve the problem of obtaining an electric voltage indicative of the unbalance magnitude.

For applying the value $R^2$ thus determined to the purposes of indication and/or control of the necessary balance correcting operations, the system shown in FIG. 5 is further provided with an electric computer unit which comprises a multiplier 62 and an amplifier 62a and which operates to provide a voltage corresponding to the square root of the value $R^2$. Any electric square-root computer is suitable for this purpose. Preferably used is a Hall-voltage device as illustrated in FIG. 9, where 62d denotes the Hall plate, 62b the magnetic field winding, and 62c an ohmic resistor.

The resulting voltage is memorized in a storing element shown, for example, to consist of a capacitor 62′, so that this voltage is available for the subsequent control of the balance correcting operation.

The unbalance correction is effected by means of a drill 41 (FIGS. 3 and 5). The drill 41 is mounted on an angularly displaceable tool holder as hereinbefore described with reference to FIG. 3, the devices for angularly adjusting the drill being generally denoted in FIG. 5 by 157, and more fully described hereinafter with reference to FIG. 10a. Assume that, by the means still to be described, the tool has the correct angular position, then the correcting operation proper is started by shifting the drill holder toward the workpiece. This is done by closing a manual switch PB or by automatic operation of a contactor SC (FIG. 16). In either case, the stored voltage of capacitor 62′ is applied to a zero-voltage relay device 151 (FIGS. 5, 16) which picks up when, and as long as the capacitor voltage has an appreciable finite value. In the embodiment of the relay device 151 shown in FIG. 16, two voltage amplifier tubes 151a, 151b are connected in a balanced resistance network and have their respective plates connected serially with a relay 151c in a zero branch so that the relay 151c closes its contact and contactor FC whenever the capacitor 62′ is charged and thus disturbs the balance of the bridge network. The relay 151c then causes the drill feed motor FM to be energized until the voltage of capacitor 62′ drops substantially to zero.

When the drill, thus being fed toward the workpiece, starts engaging the workpiece, a switch 152 closes and completes an electric circuit for a pulse transmitter 153. The provision of such a switch and pulse transmitter for the purpose of controlling the drilling depth may be in accordance with the corresponding devices more fully illustrated and described with reference to FIGS. 8 and 9 of my U.S. Patent 2,810,307, issued Oct. 22, 1957, assigned to the assignee of the present invention.

The pulse transmitter 153 (FIGS. 5, 16) comprises two interrupter switches 154a, 154b which are controlled by respective cams 154c and 154d. The cams are actuated by the feed drive 155 of the tool holder which is operated by the motor FM. The feed motion of the drill 41 into the workpiece 28 is then translated into a series of electric pulses. These pulses are given an accurate dosage, independently of the shape of the cams 154c, 154d, with the aid of a dosage element, preferably a capacitor 156, so that during each rotation of the cam shaft 154 always the same quantity of the EMF stored in the element 62′ is issued, regardless of whether the feed motion of the workpiece is fast or slow.

The automatic feed control device functions as follows:

After completion of the measuring run, the voltage value R equivalent to the unbalance magnitude is stored in the element 62′. After the drill is set to the correct angular position, the correcting operation is initiated by manual actuation of switch PB (FIG. 16) or by automatic actuation of contactor SC. This causes the relay 151c to energize a contactor FC which closes the power circuit of the drill feed motor FM. Now the drill 41 travels toward the workpiece. When the tip of drill 41 touches the workpiece 28 it closes the switch 152. Now the voltage from capacitor 62′ is applied to the dosage capacitor 156 when interrupter contact 154b is open and interrupter contact 154a is closed. The capacitor 156 becomes charged at a rate adjusted by means of a rheostat 156a. As soon as, during further progress of the drilling operation, the interrupter contact 154a opens, the interrupter 154b closes and permits the capacitor 156 to discharge. This cycle of charging and discharging the capacitor 156 is periodically repeated until the voltage in the storage capacitor 62′ drops below the zero or threshold value at which time the relay 151c and the contactor FC drop off and stop the feed motor FM. As a result, the drilling depth is accurately limited in dependence upon the number of rotations of the control cams 154c, 154d and in dependence upon the voltage magnitude previously stored in the capacitor 62'. With the correcting work thus completed, the feed motor is caused to rotate in the reverse direction by suitable reversing contacts (not illustrated), whereafter the system is ready for another control operation.

*Unbalance-angle measurement*

While the system portion described above with reference to FIG. 5 performs an automatic control of the unbalance correction after the correcting tool was previously set to the proper angular relation to the workpiece, the system portion described hereinafter with reference to FIGS. 10a, 10b comprises the means for performing the just-mentioned angular adjustment between correcting tool and workpiece.

In FIG. 10a, the voltages from the oscillation pickups 15 and 30 according to FIGS. 1, 2, 3 and 4 are applied, preferably upon amplification in a device 63, through leads 64a, 65a, 66a and 67a, to four multiplier units 84, 85, 86 and 87. Although the system portions of FIGS. 5 and 10a, 10b are separately illustrated and separately described herein, they form part of a single measuring and control system which has the pickups 15, 30 and phase reference generators in common. That is, the components 15, 30 and 10, 27 of FIGS. 10a, 10b are identical with the same components of FIG. 5.

Each of the multiplier units 84, 85, 86 and 87 may correspond, for example, to that described with reference to FIG. 7. The multiplier units 84, 85, 86 and 87 also receive, as the respective other factors, sine voltage or sine current $I_1$ and cosine voltage or cosine current $I_2$, respectively. These are supplied from the auxiliary phase reference generator 10 or 27, according to FIGS. 1, 2, 3, 4, operating as a phase or angle reference transmitter. The multiplier units 84 and 86 are energized through leads 64b and 66b by sine current $I_1$. The multiplier units 85 and 87 are energized through leads 65b and 67b by cosine current $I_2$. The output leads 84a and 85a therefore supply voltages $N_1$ and $N_2$ respectively, which correspond to the vertical and horizontal unbalance components.

The voltage $N_1$ passes through an amplifier 84b to a second multiplier unit 89 which may correspond to that described with reference to FIG. 7. The voltage $N_2$ is also applied to the multiplier unit 89, but through a reciprocator 85b which applies to said multiplier unit a voltage corresponding to the reciprocal value $1/N_2$. Consequently, the output lead 90 of the multiplier unit 89 supplies to the amplifier 91 a voltage which corresponds to the quotient $N_1/N_2$ which is the product of $N_1$ and $1/N_2$. The reciprocator 85b and the multiplier unit 89 thus form a quotient computer and may be replaced by a suitable solid state quotient computer such as, for example, that described in United States Patent No. 2,808,988.

The illustrated embodiment of the quotient computer, composed of a reciprocal-value computer 85b and a multiplier 89, may have a circuitry as schematically illustrated in FIG. 12. The input voltage $N_2$ is applied in circuit 85a to the magnetizing winding 85d of a Hall generator. The output circuit of the appertaining Hall wafer 85c is connected to an amplifier 85e whose output circuit is connected in series with the current supply terminals of the wafer 85c and in series with the current supply terminals of the Hall plate 89c in multiplier 89. The second input voltage $N_1$ is applied to the magnetizing winding 89d of multiplier 89. Under these conditions the voltage of the output circuit 90 of unit 89 is proportional or equal to the ratio $N_1/N_2$. Such quotient computers are known as such; for example from Siemens-Zeitschrift of September 1954, pages 376 to 384, FIG. 10.

The output circuit of the amplifier 91 is provided with a limiting device. The output voltage of the amplifier 91, proportional to the quotient $N_1/N_2$, can be stored in a capacitor 92 connected to the leads 91a. Since the quotient $N_1/N_2$, as hereinbefore explained, may assume a value between "zero" and "infinity," the limitation of the voltage applied to the capacitor 92 by means of the aforementioned limiting device is necessary. Suitable values for the limits are, for example, the angle $\varphi=22.5°$ and $\varphi=67.5°$ or the values 0.42 and 2.42 of the corresponding tangent functions. As soon as one of the given limits is exceeded, the limiting device, which is, for example, the relay 93, 94, connected with the amplifier 91, disconnects the system 84, 85 to 89, 91 and instead connects the system 86, 87 to 97 into the circuit.

Figure 13:
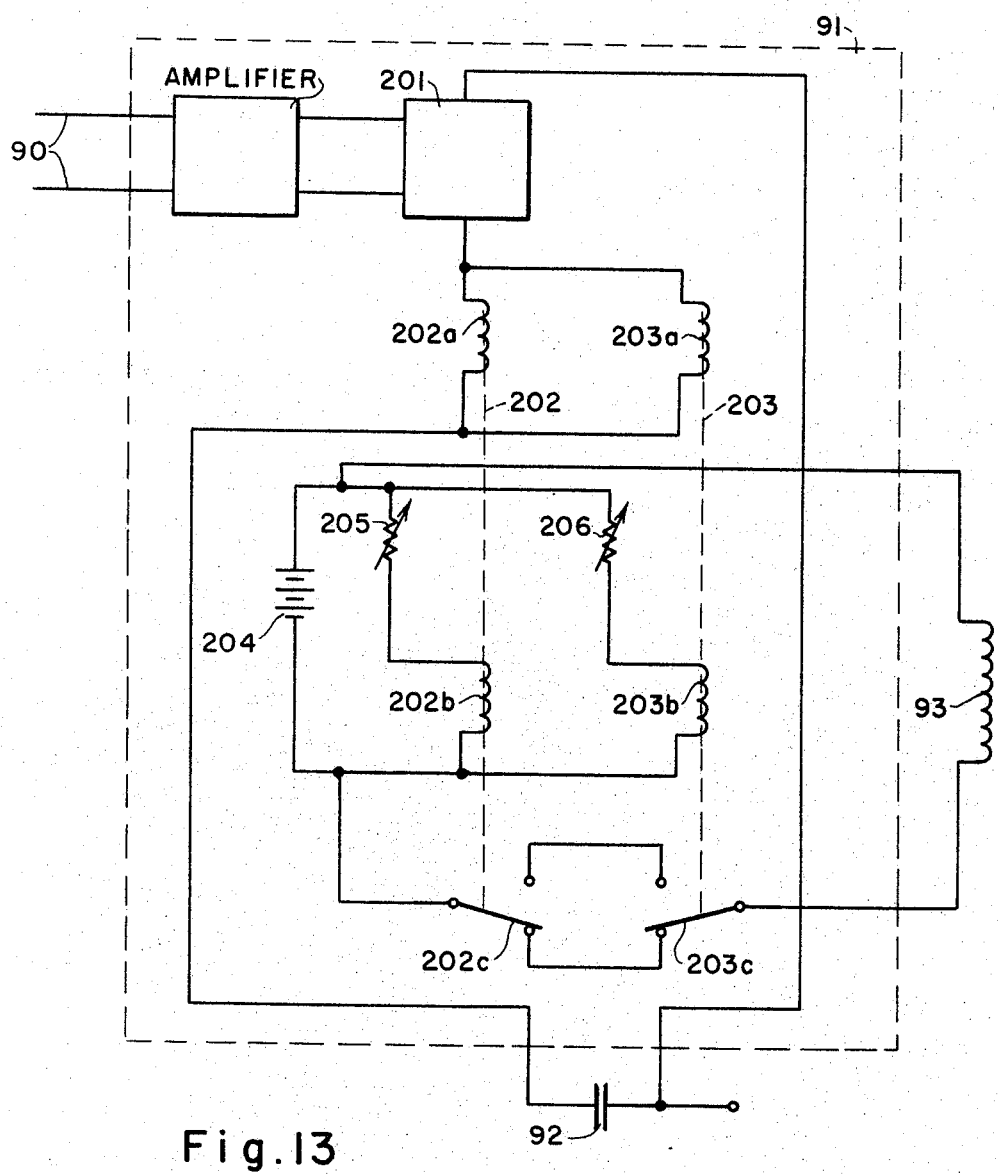

As hereinbefore mentioned, the voltage required for controlling the limit values is supplied from the amplifier 91 to the relay 93, 94. For this purpose, and as shown in FIG. 13, the voltage available at the output terminals of amplifier 91 for charging the capacitor 92 may be supplied through a tube-separating stage 201 to two sensitive, polarized relays 202 and 203. Each of the relays 202 and 203 has two separate windings 202a, 202b, and 203a, 203b, respectively. One winding of each of the relays 202 and 203 is energized by voltage from the amplifier 91 and the other winding of each of the relays 202 and 203 is energized from a stabilized current source 204 through a resistor 205 and 206, respectively. The respective resistor 205, 206 permits adjusting the premagnetization of the relays 202 and 203 so that said relays respond only when a given limit value is exceeded, for example the value 0.42 or 2.42 volts. Then, when the output voltage of the amplifier 91 is below 0.42 volt, neither relay 202 nor relay 203 will switch; and the normally closed contacts 202c and 203c of said relays supply current to the relay 93 which then switches over to the coordinates $x'$ and $y'$. When the value of the output voltage of the amplifier 91 is between 0.42 and 2.42 volts, only the relay 202 switches, and the relay 93 is no longer energized. Consequently, the measuring operation is then performed for the coordinates $x$ and $y$. When the value 2.42 volts is exceeded, the relays 202 and 203 pick up so that the relay 93 is energized through the normally open contacts and again switches for measuring with respect to the coordinates $x'$ and $y'$.

The system of components 86 and 97 corresponds to the aforementioned reference system having the axes $x'$ and $y'$. The multiplier units 86 and 87 apply through the respective leads 86a and 87a voltages $N_1$ and $N_2$ to units 88' and 88", respectively. The voltages $N_1$ and $N_2$ are amplified in the units 88' and 88", respectively. In the difference network 88', the difference $N_1-N_2$ is produced and in the sum network 88", the sum $N_1+N_2$ is produced. An example of suitable circuitry for units 88' and 88" is shown in FIG. 14. The amplifier in each unit has two direct-current output circuits. One output circuit of one amplifier is connected in series-cumulative relation with one output circuit of the other amplifier to provide the difference voltage $N_1-N_2$ in circuit 88'a. The other two output circuits of the respective amplifiers are connected in series-opposed relation to furnish the sum voltage $N_1+N_2$ in circuit 96a.

The difference voltage $N_1-N_2$ passes through the leads 88'a directly to a multiplier unit 95. The sum voltage is applied through leads 96a to a reciprocator 96 which produces the reciprocal value $1/(N_1+N_2)$ and applies a corresponding voltage to the multiplier unit 95. The multiplier unit 95 produces in its output leads 95a the voltage $N_1'/N_2'$ which corresponds to the quotient of the $x'$, $y'$ 45° phase displaced voltage. The multiplier unit 95 and the reciprocator 96 may correspond to the quotient computer 89, 85b of FIG. 12. The voltage $N_1'/N_2'$ is amplified in amplifier 97 and can be stored in capacitor 98 until it is transmitted by means of the relay contact 94. The phase-displaced voltage $N_1'/N_2'$ is always available when it is needed due to the limit value being exceeded.

Figure 10B:
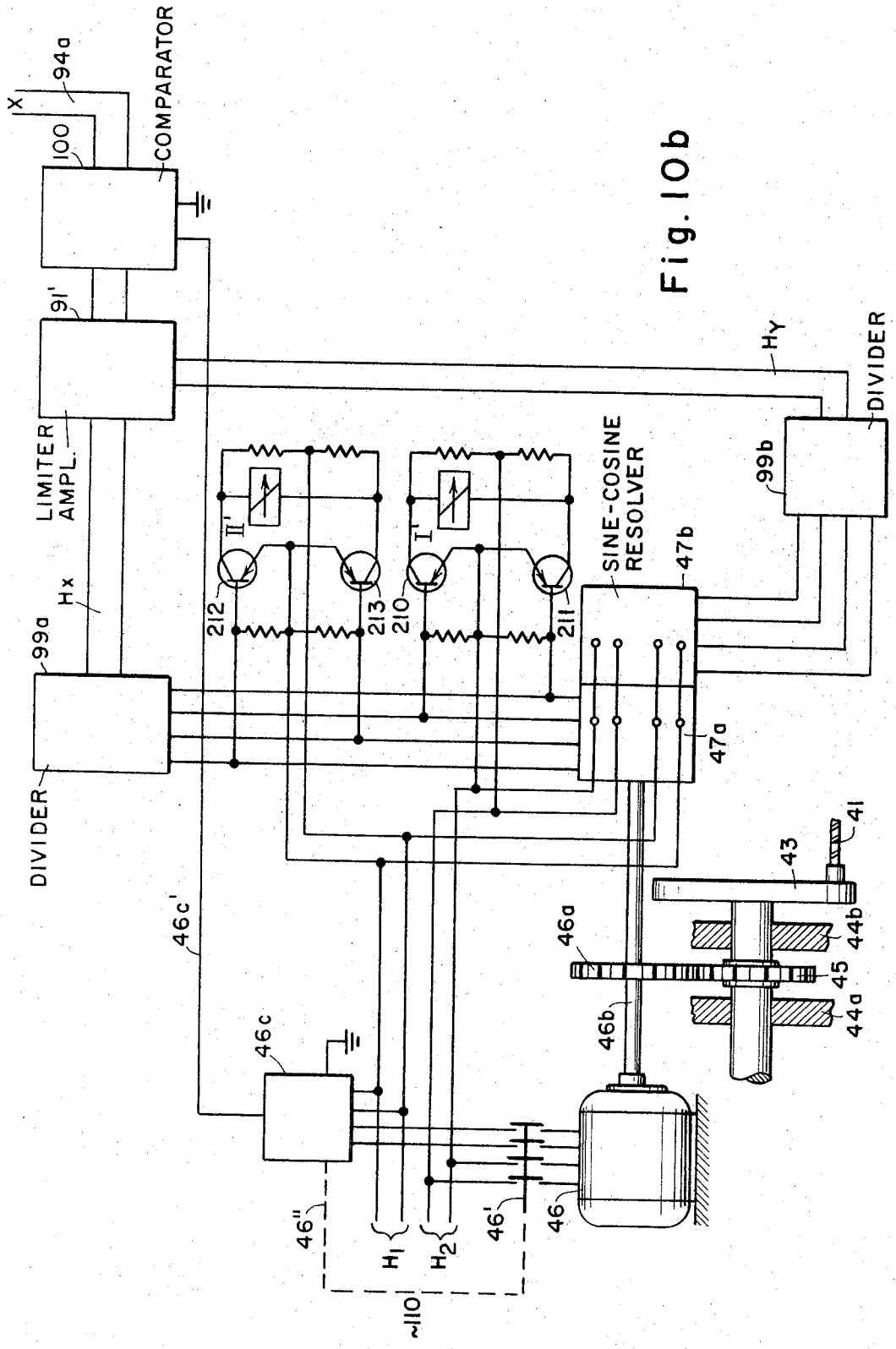
Figure 15:
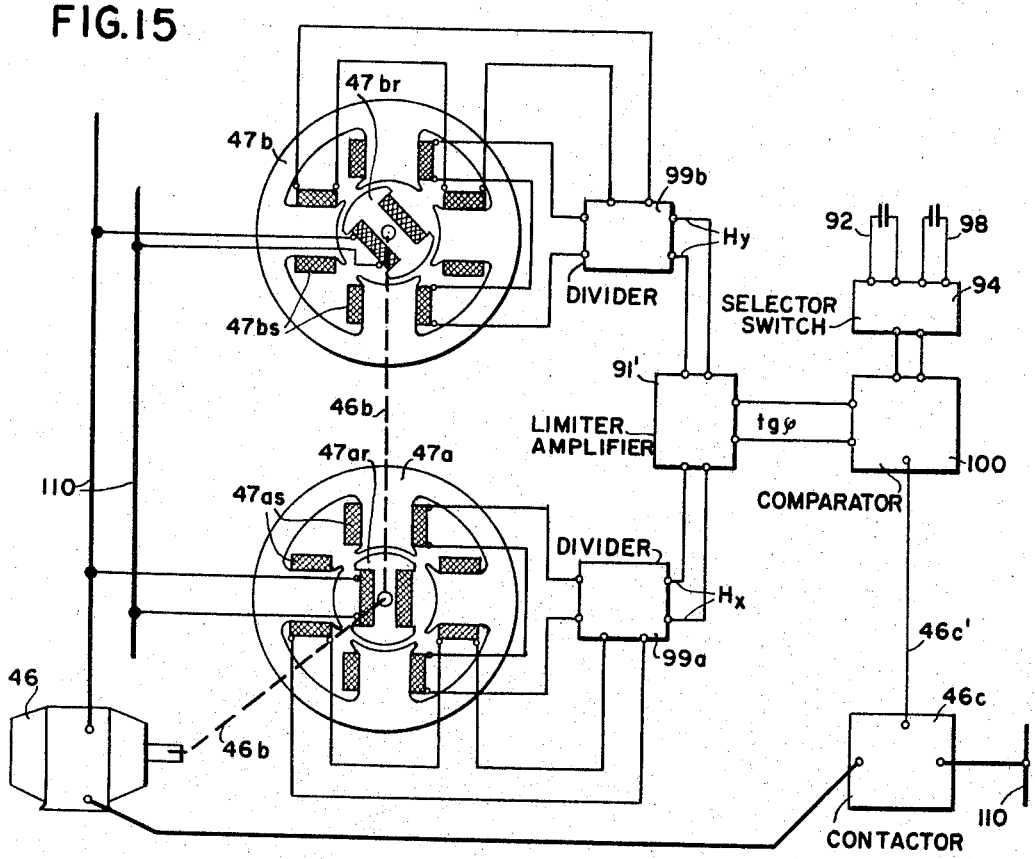
FIG. 15 is a schematic circuit arrangement of an embodiment of a sine-cosine wave generator used as a potentiometric resolver in the arrangements of FIGS. 10a, 10b.

For transferring the measured value of the unbalance direction or angular unbalance position to the angle-adjusting members 46, 46a, 46b, 45 of the balance-correcting machining device or drill 41, a comparison is made in the circuit arrangement of FIG. 10b between the quotient $N_1/N_2$ or the quotient $N_1'/N_2'$ and the quotient of two auxiliary voltages. For this purpose, the quotient value $N_1/N_2$ or $N_1'/N_2'$, available at the relay switch 94, is supplied to a comparator 100 (FIG. 10b). The auxiliary voltages $H_1$, $H_2$ may be derived from a utility current or power supply line 110. A sine-cosine transmitter or resolver 47a, 47b, which is schematically shown in FIG. 15 and will be more fully described hereinafter, modifies the auxiliary voltages in dependence upon the position of the correcting tool 41 in relation to the workpiece. The modified auxiliary voltages are passed to divider units 99a and 99b which produce quotient voltages $Hx$ and $Hy$ in a manner similar to that of the aforedescribed quotient computers of the system and pass such quotient voltages to the comparator 100 through a limiting amplifier 91' which is identical with the limiter amplifier 91. The comparator 100 interrupts the machining operation of the tool 41 initiated by the motor 46 through the spur gear transmission 46b, 46a, 45 by controlling through the line 46'c a switching mechanism 46c to switch-off the supply of power to said motor 46 via a switch 46' and a coupling 46".

For determining the quadrant to which the determined unbalance in one of the coordinate systems $x$, $y$ or $x'$, $y'$ applies, the polarity of the measured electrical magnitudes $N_1$ and $N_2$ is determined by means of relays I and II (FIG. 10a) on the one hand; and with the aid of relays I' and II' (FIG. 10b) the angular position of the shaft 46a is determined in accordance with quadrant values. The relay I (FIG. 10a) is connected across the leads 84a between the multiplier unit 84 and the amplifier 84b. The relay II (FIG. 10a) is connected across the leads 85a between the multiplier unit 85 and the reciprocator 85b. The relay I' is connected between the collector electrodes of transistors 210 and 211 in FIG. 10b. The relay II' is connected between the collector electrodes of transistors 212 and 213 in FIG. 10b.

The switching positions of the relays I, II and I', II' effect the connection of predetermined ones of line paths $a$, $b$, $c$, $d$ into the circuit $x$—$x$ or 94a extending between the capacitor 92 or the capacitor 98 and the comparator 100. The quadrant in question is determined as soon as the conductance path or circuit $x$—$x$ is closed and the electrical signals find a passage from the capacitor 92 or the capacitor 98 through said path or circuit to the comparator 100.

The ralays I, II, I' and II' are so designed that their movable contacts $Ia$ or $IIa$, $IIb$ and $I'a$ or $II'a$, $II'b$ are in given normal rest positions. The relays I and I' each have only a single movable contact $Ia$ and $I'a$, respectively. The relays II and II', however, each have two movable contacts $IIa$, $IIb$ and $II'a$, $II'b$, respectively. These movable contacts are shown in their rest position in FIG. 10a. Consequently, a direct current passing through the relays either causes a switching-over, or causes the movable contacts to remain in the normal rest position, depending upon the polarity or direction of the current flow.

The following combinations of contact positions will occur in relays I, II and I', II':

Firest quadrant: I and I' in normal position, II and II' in normal position, so that the circuit is through the path $d$.

Second quadrant: I and I' in normal position, II and II' in reversed position, so that the circuit is through the path $c$.

Third quadrant: I and I', and also II and II' in reversed position, so that the circuit is through the path $b$.

Fourth quadrant: I and I' in reversed position, II and II' in normal position, so that the circuit is through the path $a$.

The polarized relay I has its coils connected to the leads 84a to enable it to determine the polarity of the measured magnitude $N_1$, and the polarized relay II has its coils connected to the leads 85a to enable it to determine the polarity of the measured magnitude $N_2$.

For determining the angular position of the shaft 46b, the relays I' and II' are controlled by the sine-cosine transmitter or resolver 47a. Since alternating currents flow in the transmitter 47a, the transistors 210, 211, 212 and 213 are coordinated as phase-dependent components to the coils of the relays I' and II'.

The tool 41 must be turned to the angular position which is correct for performing the unbalance-correcting machining operation. In this respect, it is essential that the motor 46, after being placed in operation by closing of the switch 46', always remain switched on so that it continues to change the angular position of the workpiece until said motor is stopped by the switching pulse produced by the comparator 100 and which controls the switching mechanism 46c to interrupt the power supply to said motor. The switching pulse which terminates the tool-setting operation occurs as soon as the comparator 100 responds to an identity between two electrical magnitudes. One of these electrical magnitudes corresponds to the angular position of the tool 41 and is supplied from the limiting amplifier 91. The other of these electrical magnitudes corresponds to the measured angular position of the unbalance and this is supplied to the comparator 100 through the leads $x$—$x$ or 94a.

The comparator 100 does not issue a switching pulse when one of the two electrical magnitudes being compared has the "zero" value. This occurs when the circuit or leads $x$—$x$ are interrupted because selected contacts of the relays I, I', II, II' are open. Such an interruption of the connecting circuit $x$—$x$ or 94a always exists when the quadrant in which the tool 41 is located differs from the one that is essential to the measured angular position of unbalance. On the other hand, the connecting circuit $x$—$x$ is closed when the tool 41 is situated in the one quadrant that corresponds to that of the measured angular position of unbalance. The zero comparison essential for the production of the switching pulse occurs only when the connecting circuit $x$—$x$ is closed.

An example of suitable circuitry for the comparator is shown in FIG. 16. Two amplifier tubes 100a, 100b form part of a balanced resistance network whose zero branch, connected across the two plates of the respective tubes, includes a relay 100c. The tan $\varphi$ voltage of circuit 94a is compared with the quotient voltage $Hx/Hy$ from amplifier 91'. When, and as long as, these two voltages differ from each other, and difference unbalances the tube network so that the relay 100c picks up and closes the comparator output circuit 46c' which actuates a switching device or contactor 46c to energize the motor 46. This motor then changes the angular setting of the tool and also the setting of the potentiometric resolver 47a, 47b. As a result, the quotient voltage $Hx/Hy$ varies toward the value at which the tube network is balanced and the relay 100c drops off. When this occurs the contactor 46c interrupts the power supply to the motor 46 and thus causes the tool to stop in the correct angular position. This automatic control performance will be more fully explained presently.

FIG. 15 schematically illustrates by way of example the sine-cosine resolver 47a–47b as used in the system of FIGS. 10a, 10b. The resolver essentially corresponds to a commercially available synchro resolver known, for example, from the book Servo-Mechanism Practice by Ahrendt, published 1954 by McGraw-Hill Book Company. However, the two rotors 47ar and 47br are 45° displaced from each other on the shaft 46b of the angular-feed drive motor 46. Also fastened on the shaft 46b is the driving gear 46a (FIG. 10b) for the angular adjustment of the tool. Both rotors 47ar and 47br are excited from the current supply line 110 by alternating current of the same frequency and the same phase position. The rotors induce in the corresponding stator windings 47as and 47bs respective voltages whose magnitudes are dependent upon the angular positions of the rotors. In the illustrated rotor positions, the vertical stator coil of the synchro transmitter 47a provides the maximum voltage, whereas the horizontal stator coil of the same transmitter produces the minimum voltage. However, the voltages of the vertical and horizontal coils in transmitter 47b are equal to each other due to the 45° position of the rotor 47br. The voltage in each stator coil varies in accordance with a sine function when the appertaining rotor is being rotated.

Consequently the voltages $H_1 \cdot \sin \varphi$ and $H_1 \cdot \cos \varphi$ can be taken from the transmitter 47a in order to supply them to the dividing computer unit 99a which furnishes a voltage value corresponding to the function tan $\varphi$. This voltage value passes through the limiting device 91' into the comparator 100 where it is compared with the measuring voltage from capacitor 98 supplied through the switching device 94. When the voltage values in the computer unit 99a are excessively high, the limiting device 91' disconnects the unit 99a and instead connects the unit 99b with the comparator 100. The unit 99b, as explained, is impressed by the voltage values $H_2 \cdot \sin (\varphi - 45°)$ and $H_2 \cdot \cos (\varphi - 45°)$ so that then the output voltage issuing from unit 99b and corresponding to the function tan $(\alpha - 45°)$ is supplied to the comparator 100 for comparison with the appertaining measuring voltage supplied to the comparator through the switching device 94. As explained, the output circuit 46c' of comparator 100 causes the contactor 46c to stop the motor 46 when the two voltages being compared with each other are equal. The tool 41 is then located in the correct angular position in front of the workpiece and is ready for performing the correcting operation under control by the system portion described above with reference to FIG. 5.

A brief review will now be presented of a complete unbalance measuring and control operation as performed by apparatus comprising the two component systems according to FIGS. 5 and 10a, 10b.

After the workpiece is placed into the balancing machine and brought up to rotation at the proper speed, the two data-storage capacitors 62' (FIGS. 5, 17) and 92 or 98 (FIG. 10a) become charged with respective voltages that correspond to magnitude and angular position respectively of any unbalance inherent in the workpiece. Now the machine is stopped. Then a starter switch 94b (FIG. 16) is closed by the attendant or automatically. This applies the angle-indicating voltage capacitor 92 through circuit 94a to the comparator 100. Simultaneously, the Hx/Hy ratio voltage from amplifier 91' is also applied to the comparator 100. If, and as long as these two voltages differ from each other, the relay 100c responds and energizes the coil of the contactor 46c. Consequently, as soon as the starter switch 94b is closed, the contactor 46c will pick up and energize the motor 46 which turns the tool holder from the starting position toward the correct angular position relative to the workpiece. Even if switch S (FIG. 16) is closed, the closing of starter switch 94b does not cause the contactor SC to pick up because this contactor is time delayed so as to pick up with delay while dropping off immediately when deenergized. That is, the contactor SC is kept inactive because its coil circuit is interrupted by contactor 46c.

When the tool holder has reached the correct angular position, the two input voltages of the comparator 100 become equal so that relay 100c and contactor 46c drop off and stop the motor 46.

Now the contactor SC is energized, provided the switch S was previously closed by the attendant in order to set the system for automatic initiation of the drilling operation proper. The contactor SC now applies the voltage of storage capacitor 62' to the relay device 151 whose relay 151c picks up and causes the contactor FC to energize the drill feed motor FM. The drill moves toward the workpiece and, when touching it, closes the switch 152. This puts the pulse transmitter 153 into operation as described above. The relay 151c drops off and the contactor FC stops the feed motor FM only when the drilling depth reaches the value corresponding to the stored voltage of capacitor 62', as also explained above. Thereafter, the selector switch circuit 94a is opened and the drill is withdrawn from the workpiece.

It will be understood that the system as described above relates to the measuring and correcting of unbalance in only one correction plane. Hence the system is sufficient for use with the machine illustrated in FIGS. 3 and 4. If unbalance correction in two reference planes is desired, as is the case with the machine shown in FIGS. 1 and 2, the above-described control system may be duplicated or a selector switch may be used which successively switches the system into connection with the oscillation pickup 15a in one correction plane and thereafter into connection with the corresponding second oscillation pick-up for the other correction plane, as is known and conventional in this art.

It will be apparent that all components of the control system are of the static type with the exception of mechanical switching devices and contactors that do not enter into the computing and value translating operations proper. If desired, the tube amplifiers may be substituted by transistor or other semiconductor devices. Hence, such a system has a minimum of movable parts and requires and minimum of maintenance work.

Figure 17:
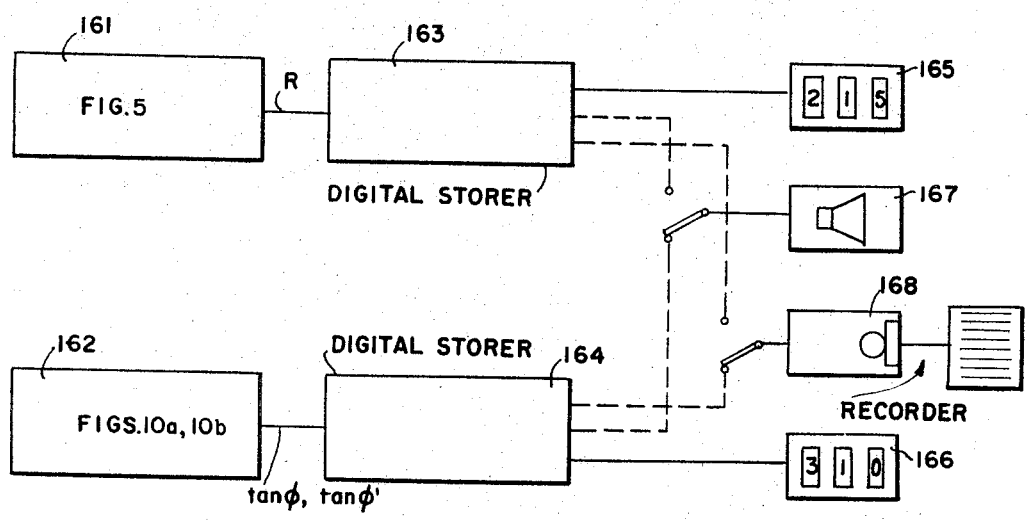
FIG. 17 is a schematic block diagram of an indicator system adapted to be utilized with the measuring and control systems illustrated.

While in the foregoing, emphasis is placed upon the control of the unbalance correcting operation in dependence upon the measured unbalance magnitude and angular position of unbalance, it will be understood that the invention is also applicable in cases where an indication or recording of the measured values is desired in lieu of, or in addition to, the control operations described above. Thus, FIG. 17 shows schematically that all measured values can be made visible by indicators, or can be indicated by audio devices or recorded, as may be desired. In FIG. 17 the system for measuring the unbalance magnitude according to FIG. 5 is symbolically indicated by the box 161. The angle-measuring system according to FIGS. 10a, 10b is similarly indicated at 162. The respective output voltages, namely voltage R in FIG. 5 and the voltage tan $\alpha$ or tan $\alpha'$ in FIGS. 10a, 10b, are stored in commercially available analog-digital translating devices as schematically indicated at 163 and 164 respectively, the storing being effected by counting a corresponding number of pulses. Such digital storer devices are known, for example, from the printed publication SH7249 of Siemens & Halske A.G., Munich, Germany (S&H). The stored values can then be indicated visibly by means of luminous indicator boards 165, 166 or can be audibily represented by magnet-tone devices (magnetic-tape reproducers) 167, such audible representation being repetitive, if desired, as is known for example from the printed publication SH6413 of the above-mentioned corporation, or/and they can be recorded by means of printing devices 168 or the like as is also known, for example, from the printed publication SH7239 of the above-mentioned corporation.

It will be obvious to those skilled in the art, upon a study of this disclosure, that my invention permits of a great variety of modifications with respect to circuit components and interconnecting circuitry and hence may be given embodiments other than particularly illustrated and described herein, without departing from the essential features of my invention and within the scope of the claims annexed hereto.

I claim:

1. Apparatus for balancing rotary workpieces by a polar-coordinate method requiring determination of magnitude and angular position of unbalance, comprising electric transducer means responsive to workpiece unbalance to provide during workpiece rotation a voltage (U) corresponding to the magnitude of unbalance; phase-reference transmitter means having a given phase relation to the workpiece rotation and comprising two phase-reference circuits to provide respective alternating phase-reference currents ($I_1$, $I_2$) of given phase displacement relative to each other; first electric multiplier means connected to said transducer means and to one of said reference circuits and having an output circuit to furnish a first product voltage ($UI_1$) corresponding to the product of said transducer voltage times one of said phase-reference currents; second electric multiplier means connected to said transducer means and to said other reference circuit and having an output circuit to furnish a second product voltage ($UI_2$) corresponding to the product of said transducer voltage times said other current; two voltage squaring means connected to said respective output circuits of said first and second multiplier means to provide two squared voltages $$[N_1^2 = (UI_1)^2;\ N_2^2 = (UI_2)^2]$$

respectively; circuit means interconnecting said two squaring means in voltage-additive relation so as to provide a resultant sum voltage ($R^2 = N_1^2 + N_2^2$) indicative of the unbalance magnitude to be corrected; electric quotient computer means for forming the quotient ($N_1/N_2$) of said two product voltages, said quotient computer means having an output voltage indicative of the angular position of the unbalance; first signal receiving means connected to said quotient computer means to operate in dependence upon said angular position; and second signal receiving means connected to said circuit means to operate in dependence upon said unbalance magnitude.

2. Apparatus for balancing rotary workpieces by a polar-coordinate method requiring determination of magnitude and angular position of unbalance, comprising electric transducer means responsive to workpiece unbalance to provide during workpiece rotation a voltage corresponding to the magnitude of unbalance; rotatable phase-reference transmitter means having a given phase relation to the workpiece rotation and comprising two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; two voltage squaring means connected to said respective output circuits of said first and second multiplier means to provide two squared voltages respectively; circuit means interconnecting said two squaring means in voltage-additive relation so as to provide a resultant sum voltage indicative of the unbalance magnitude to be corrected; an electric quotient computer connected to said first and second multiplier means for forming the quotient of said two product voltages, said quotient computer having an output voltage representative of the angular position of the unbalance; and two voltage-responsive data storers connected to said circuit means and to said quotient computer respectively to provide respective signals for subsequent control of unbalance correction.

3. Apparatus for balancing rotary workpieces by a polar-coordinate method requiring determination of magnitude and angular position of unbalance, comprising electric transducer means responsive to workpiece unbalance to provide during workpiece rotation a voltage corresponding to the magnitude of unbalance; rotatable phase-reference transmitter means having a given phase relation to the workpiece rotation and comprising two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; two voltage squaring means connected to said respective output circuits of said first and second multiplier means to provide two squared voltages respectively; circuit means interconnecting said two squaring means in voltage-additive relation; an electric desquaring computer connected to said circuit means and having an output voltage substantially linearly proportional to the magnitude of the unbalance to be corrected; an electric quotient computer connected to said first and second multiplier means for forming the quotient of said two product voltages, said quotient computer having an output voltage representative of the angular position of the unbalance; and two voltage-responsive data storers connected to said circuit means and to said quotient computer respectively to provide respective signals for subsequent control of unbalance correction.

4. Apparatus for balancing rotary workpieces by a polar-coordinate method requiring determination of magnitude and angular position of unbalance, comprising electric transducer means responsive to workpiece unbalance to provide during workpiece rotation a voltage corresponding to the magnitude of unbalance; phase reference transmitter means having a given phase relation to the workpiece rotation and comprising two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; two voltage squaring means connected to said respective output circuits of said first and second multiplier means to provide two squared voltages respectively; circuit means interconnecting said two squaring means in voltage-additive relation so as to provide a resultant sum voltage depending upon the unbalance magnitude to be corrected; first voltage-responsive data storer means connected to said circuit means to provide stored data for subsequent correction of the unbalance magnitude; a first electric quotient computer connected to said first and second multiplier means for response to said two product voltages and having an output voltage indicative of the angular position of unbalance in a first coordinate system of reference; a second electric quotient computer connected to said first and second multiplier means for response to said two product voltages and having an output voltage indicative of the angular position of unbalance in a second coordinate system of reference angularly displaced from said first coordinate system; whereby said two quotient computers provide selectively available voltages indicative of the angular position of the unbalance to be corrected.

5. Balancing apparatus according to claim 4, comprising two voltage-responsive data storer means connected to said respective two quotient computers for storing said respective two angular-position voltages, and a selector switch connected with said two storer means for applying a selected one of said two stored voltages.

6. Apparatus for balancing rotary workpieces by a polar-coordinate method requiring determination of magnitude and angular position of unbalance, comprising electric transducer means responsive to workpiece unbalance to provide during workpiece rotation a voltage corresponding to the magnitude of unbalance; phase-reference transmitter means having a given phase relation to the workpiece rotation and comprising two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; two voltage squaring means connected to said respective output circuits of said first and second multiplier means to provide two squared voltages respectively; circuit means interconnecting said two squaring means in voltage-additive relation; an electric desquaring computer connected to said circuit means and having an output voltage substantially linearly proportional to the magnitude of the unbalance to be corrected; a first voltage-responsive data storer device connected to said desquaring means to provide a stored signal for subsequent unbalance correction; a first electric quotient computer connected to said first and second multiplier means for response to said two product voltages and having an output voltage indicative of the angular position of unbalance in a first coordinate system of reference; a second electric quotient computer connected to said first and second multiplier means for response to said two product voltages and having an output voltage indicative of the angular position of unbalance in a second coordinate system of reference angularly displaced from said first coordinate system; and second and third data storer devices connected to said respective two quotient computers to provide selectively applicable signals indicative of the angular position of unbalance.

7. Apparatus for balancing rotary workpieces, comprising electric transducer means responsive to workpiece unbalance to provide during workpiece rotation a voltage corresponding to the magnitude of unbalance; phase-reference transmitter means synchronous with the workpiece rotation and having two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; two voltage squaring means connected to said respective output circuits of said first and second multiplier means to provide two squared voltages respectively; circuit means interconnecting said two squaring means in voltage-additive relation; an electric desquaring computer connected to said circuit means and having an output voltage substantially linearly proportional to the magnitude of the unbalance to be corrected; unbalance correction control means for locally changing the amount of material on the workpiece in accordance with said output voltage, said control means having a capacitor connected to said desquaring computer to be charged with said output voltage, and a pulse transmitter having a dosage element periodically connected to said capacitor to successively and incrementally deplete the charge of said capacitor, whereby said pulse transmitter furnishes correction control pulses whose number depends upon the value of said output voltage.

8. Apparatus for balancing rotary workpieces, comprising electric transducer means responsive to workpiece unbalance to provide during workpiece rotation a voltage corresponding to the magnitude of unbalance; phase-reference transmitter means having a given phase relation to the workpiece rotation and comprising two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase reference currents; second electric multiplier means connected to said transducer means and to said other reference circuit and having an output circuit to furnish a second product voltage corresponding to the product of said transducer voltage times said other current; a first electric quotient computer connected to said first and second multiplier means for response to said two product voltages and having an output voltage indicative of the angular position of unbalance in a first coordinate system of reference; a second electric quotient computer connected to said first and second multiplier means for response to said two product voltages and having an output voltage indicative of the angular position of unbalance in a second coordinate system of reference angularly displaced from said first coordinate system; voltage-source means having a reference voltage indicative of the angular position of the workpiece; a comparator having two voltage input circuits of which one is connected to said source means; switch means selectively connecting said other comparator input circuit to one of said respective quotient computers; and unbalance-correction control means connected with said comparator output circuit for controlling the angular position of unbalance correction in dependence upon a given quantitative relation of the two comparator input voltages.

9. Balancing apparatus according to claim 8, comprising two storage capacitors connected between said comparator and said two quotient computers respectively for storing said respective quotient-computer output voltages; and said comparator comprising a balanceable relay circuit having relay means responsive to departure of a selected one of said capacitor voltages from said reference voltage of said source means.

10. Apparatus for balancing rotary workpieces, comprising electric transducer means responsive to workpiece unbalance during workpiece rotation to provide a transducer voltage corresponding to the magnitude of unbalance; phase-reference transmitter means having two phase-reference circuits to provide respective alternating phase-reference currents synchronous with the workpiece rotation and of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; two voltage squaring means connected to said respective output circuits of said first and second multiplier means to provide two squared voltages respectively; circuit means interconnecting said two squaring means in voltage-additive relation so as to provide a resultant sum voltage equivalent to the unbalance magnitude to be corrected.

11. Balancing apparatus according to claim 10, comprising a desquaring device connected to said circuit means to receive said sum voltage therefrom, said desquaring device having an output voltage linearly proportional to said unbalance magnitude.

12. Balancing apparatus according to claim 8, comprising a voltage responsive relay device connected with one of said two quotient computers so as to respond when the output voltage of said one computer changes beyond a given range, said relay device being connected with said switch means for controlling it to connect said other quotient computer with said other comparator input circuit due to response of said relay device.

13. In balancing apparatus according to claim 8, said unbalance-correction control means comprising an auxiliary source of voltage variable in dependence upon progress of the angular position correcting operation, said auxiliary source being connected to said comparator output circuit.

14. Apparatus for balancing rotary workpieces, comprising electric transducer means responsive to workpiece unbalance to provide during workpiece rotation a voltage corresponding to the magnitude of unbalance; phase-reference transmitter means having a given phase relation to the workpiece rotation and comprising two phase-reference circuits to provide respective alternating phase-reference currents of given phase displacement relative to each other; first electric multiplier means connected to said transducer means and to one of said reference circuits and having an output circuit to furnish a first product voltage corresponding to the product of said transducer voltage times one of said phase-reference currents; second electric multiplier means connected to said transducer means and to said other reference circuit and having an output circuit to furnish a second product voltage corresponding to the product of said transducer voltage times said other current; a first electric quotient computer connected to said first and second multiplier means for response to said two product voltages and having an output voltage indicative of the angular position of unbalance; unbalance correcting means angularly adjustable relative to the workpiece and capable of feed motion toward the workpiece; a source of auxiliary voltage variable in accordance with the angular position of said correcting means relative to the workpiece; a comparator having two voltage input circuits of which one is connected to said source means and the other to said quotient computer; relay means connected to said comparator for response when said correcting means are in proper angular position relative to the workpiece so that said auxiliary voltage corresponds to said quotient-computer output voltage; feed control means for producing said feed motion of said unbalance-correcting means, said feed control means being connected to said relay means to commence said feed motion when said correcting means is in said proper angular position.

15. In a balancing machine according to claim 1, each of said multiplier means, squaring means and quotient computer means consisting of a solid-state device having a computing member formed of an electric semiconductor.

References Cited

UNITED STATES PATENTS

| 2,810,307 | 10/1957 | Hack | 73—464 X |
| 2,817,971 | 12/1957 | Gruber | 73—462 |
| 2,980,331 | 4/1961 | Gruber et al. | 73—462 X |
| 2,985,833 | 5/1961 | Trimble | 73—462 X |

JAMES J. GILL, *Acting Primary Examiner.*